(12) United States Patent
Lee et al.

(10) Patent No.: US 11,546,500 B2
(45) Date of Patent: Jan. 3, 2023

(54) DISPLAY APPARATUS CAPABLE OF DETECTING DAMAGE TO A HOUSING ACCOMMODATING A DISPLAY

(71) Applicant: LG ELECTRONICS INC., Seoul (KR)

(72) Inventors: Jaebeom Lee, Seoul (KR); Sangkwon Kim, Seoul (KR); Taewook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/229,716

(22) Filed: Apr. 13, 2021

(65) Prior Publication Data

US 2021/0360143 A1 Nov. 18, 2021

(30) Foreign Application Priority Data

May 15, 2020 (KR) .................. 10-2020-0058437

(51) Int. Cl.
*H04N 5/232* (2006.01)
*H04N 5/225* (2006.01)
*H04N 5/235* (2006.01)

(52) U.S. Cl.
CPC ....... *H04N 5/23206* (2013.01); *H04N 5/2254* (2013.01); *H04N 5/2354* (2013.01); *H04N 5/232939* (2018.08)

(58) Field of Classification Search
CPC ............ H04N 5/23206; H04N 5/2254; H04N 5/232939; H04N 5/2354
See application file for complete search history.

(56) References Cited

U.S. PATENT DOCUMENTS

2002/0101173 A1* 8/2002 Tsai .................. G09G 3/298
315/169.3

FOREIGN PATENT DOCUMENTS

JP 4243500 8/1992
JP 11352070 12/1999
JP 11352070 A * 12/1999
(Continued)

OTHER PUBLICATIONS

Korean Intellectual Property Office Application No. 10-2020-0058437, Notice of Allowance dated Jun. 30, 2021, 2 pages.
(Continued)

*Primary Examiner* — Ahmed A Berhan
(74) *Attorney, Agent, or Firm* — Lee Hong Degerman Kang Waimey

(57) ABSTRACT

Provided is a display apparatus including: a display module; a housing accommodating the display module; a transparent substrate disposed on a front surface of the display module and installed in the housing; a transmitter disposed on one end of the transparent substrate and generating light; a receiver installed on the other end of the transparent substrate to face the transmitter in a first direction, and receiving the light emitted from the transmitter; and a receiver installed on the other end of the transparent substrate to face the transmitter in a first direction, and receiving the light emitted from the transmitter; and a control unit driving the display module, and determining whether the transparent substrate is damaged based on a signal received from the receiver.

12 Claims, 13 Drawing Sheets

(56) References Cited

FOREIGN PATENT DOCUMENTS

| | | |
|---|---|---|
| JP | 3036733 | 4/2000 |
| KR | 1020080019395 | 3/2008 |
| KR | 1020080057270 | 6/2008 |
| KR | 1020160032004 | 3/2016 |
| KR | 1020170010922 | 2/2017 |
| KR | 101748029 | 6/2017 |

OTHER PUBLICATIONS

European Patent Office Application Serial No. 21167819.8, Search Report dated Oct. 1, 2021, 11 pages.
Korean Intellectual Property Office Application No. 10-2020-0058437, Office Action dated Jan. 29, 2021, 5 pages.

\* cited by examiner

DISPLAY APPARATUS CAPABLE OF DETECTING DAMAGE TO A HOUSING ACCOMMODATING A DISPLAY

CROSS-REFERENCE TO RELATED APPLICATION

Pursuant to 35 U.S.C. § 119(a), this application claims the benefit of earlier filing date and right of priority to Korean Patent Application No. 10-2020-0058437, filed on May 15, 2020, the contents of which are hereby incorporated by reference herein its entirety.

BACKGROUND OF THE DISCLOSURE

Field of the Disclosure

The present disclosure relates to a display apparatus configured to allow damage to a housing to be easily known.

Related Art

Display apparatuses using LCD or OLED panels are widely used throughout the industry. As an example, the display devices may be used as a digital signage which displays various information such as texts or images or is used as a billboard in a public space or a commercial space.

In recent years, a demand for the digital signage has increased due to rapid development of an intelligent imaging apparatus based on an LCD or LED. However, since a place in which the apparatus is used is outdoors or in a worse environment than indoors, a special design that is different from an apparatus for a home is required.

Typically, the digital signage for advertisement is installed outdoors and since the digital signage is exposed to an external environment, there is continuously a risk of damage and in particular, when a glass substrate installed on a front surface of a housing is damaged, a rapid repair for an advertisement image is required, but the digital signage is installed outdoors, and as a result, there has been a difficulty in maintenance.

SUMMARY

An object of the present disclosure is to solve the problems and other problems.

An object of the present disclosure is to allow damage to be known when a housing keeping a display, in particular, a transparent substrate of a front surface, is damaged.

Another object of the present disclosure is to allow, when the housing is damaged, a manager to immediately know the fact.

Yet another object of the present disclosure is to allow the manager to easily know whether the housing is damaged, even in a remote place.

In an aspect, provided is a display apparatus including: a display module; a housing accommodating the display module; a transparent substrate disposed on a front surface of the display module and installed in the housing; a transmitter disposed on one end of the transparent substrate and generating light; a receiver installed on the other end of the transparent substrate to face the transmitter in a first direction, and receiving the light emitted from the transmitter; and a receiver installed on the other end of the transparent substrate to face the transmitter in a first direction, and receiving the light emitted from the transmitter; and a control unit driving the display module, and determining whether the transparent substrate is damaged based on a signal received from the receiver.

The signal of the light passes through the transparent substrate in the first direction and is received by the receiver or passes through between the transparent substrate and the display module and is received by the receiver.

The display apparatus further includes a first reflective film attached to the front surface of the transparent substrate, in which the first reflective film reflects at least light in the same wavelength band as the light.

The display apparatus further includes a polarization filter disposed on the front surface of the transmitter, and selectively transmitting only a component of light which vibrates in a thickness direction of the front substrate.

The plurality of transmitters sequentially flickers according to a sequence of time, and the plurality of receivers is turned on at the same time after all of the plurality of transmitters is turned off to receive the signal.

The display apparatus further includes: a camera periodically photographing an exterior of the apparatus; and a storage unit recording an image photographed by the camera.

The control unit determines whether an event occurs based on signals input from sensors, stores a current image in the storage unit by controlling an operation of the camera when the event occurs, and provides a push message to a communication terminal of a manager through a network.

The control unit further stores a moving picture photographed in a time lapse in the storage unit when the event occurs.

The control unit provides the image recorded in the storage unit to the communication terminal of the manager according to a request.

DESCRIPTION OF EXEMPLARY EMBODIMENTS

Figure 1:
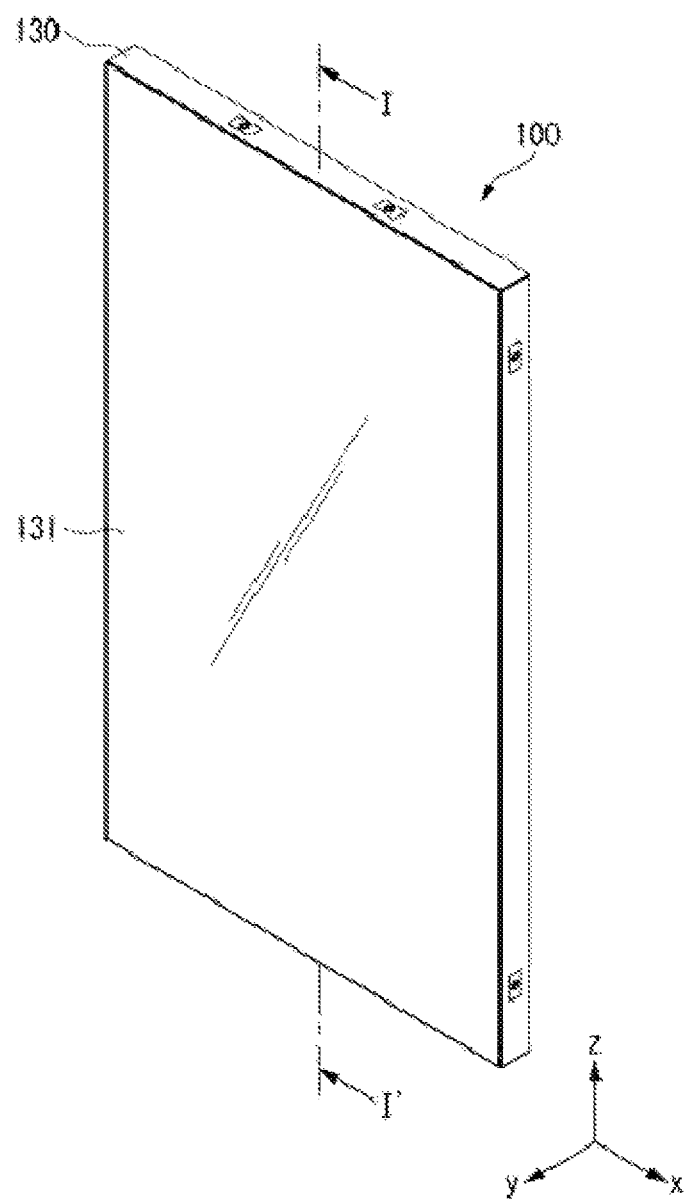
FIG. 1 illustrates an overall exterior image of a display apparatus according to an embodiment.

Hereinafter, embodiments disclosed in the present disclosure will be described in detail with reference to the accompanying drawings and the same or similar components are denoted by the same reference numerals regardless of a sign of the drawing, and duplicated description thereof will be omitted. Suffixes "module" and "unit" for components used in the following description are given or mixed in consideration of easy preparation of the present disclosure only and do not have their own distinguished meanings or roles. Further, in describing the embodiment of the present disclosure, a detailed description of related known technologies will be omitted if it is determined that the detailed description makes the gist of the embodiment disclosed in the present disclosure unclear. Further, it is to be understood that the accompanying drawings are just used for easily understanding the embodiments disclosed in the present disclosure and a technical spirit disclosed in the present disclosure is not limited by the accompanying drawings and all changes, equivalents, or substitutes included in the spirit and the technical scope of the present disclosure are included.

In addition, in the drawings, for a simplified illustration according to selection, the components of each part may be expressed slightly differently according to the drawings, but the same reference numerals represent the same components.

A display apparatus described in the present disclosure collectively refers to all apparatuses including an output unit outputting an image. Representative examples of the display apparatus include a digital TV, an analog TV, a desktop computer, a digital signage, and the like. In addition, the display apparatus may also include medium or large output apparatuses such as a signage installed in an outdoor housing. For example, an outdoor billboard, etc., may be given as an example. An embodiment of the present disclosure relates, in particular, to a display apparatus installed and used outdoors as a digital signage.

Figure 2:
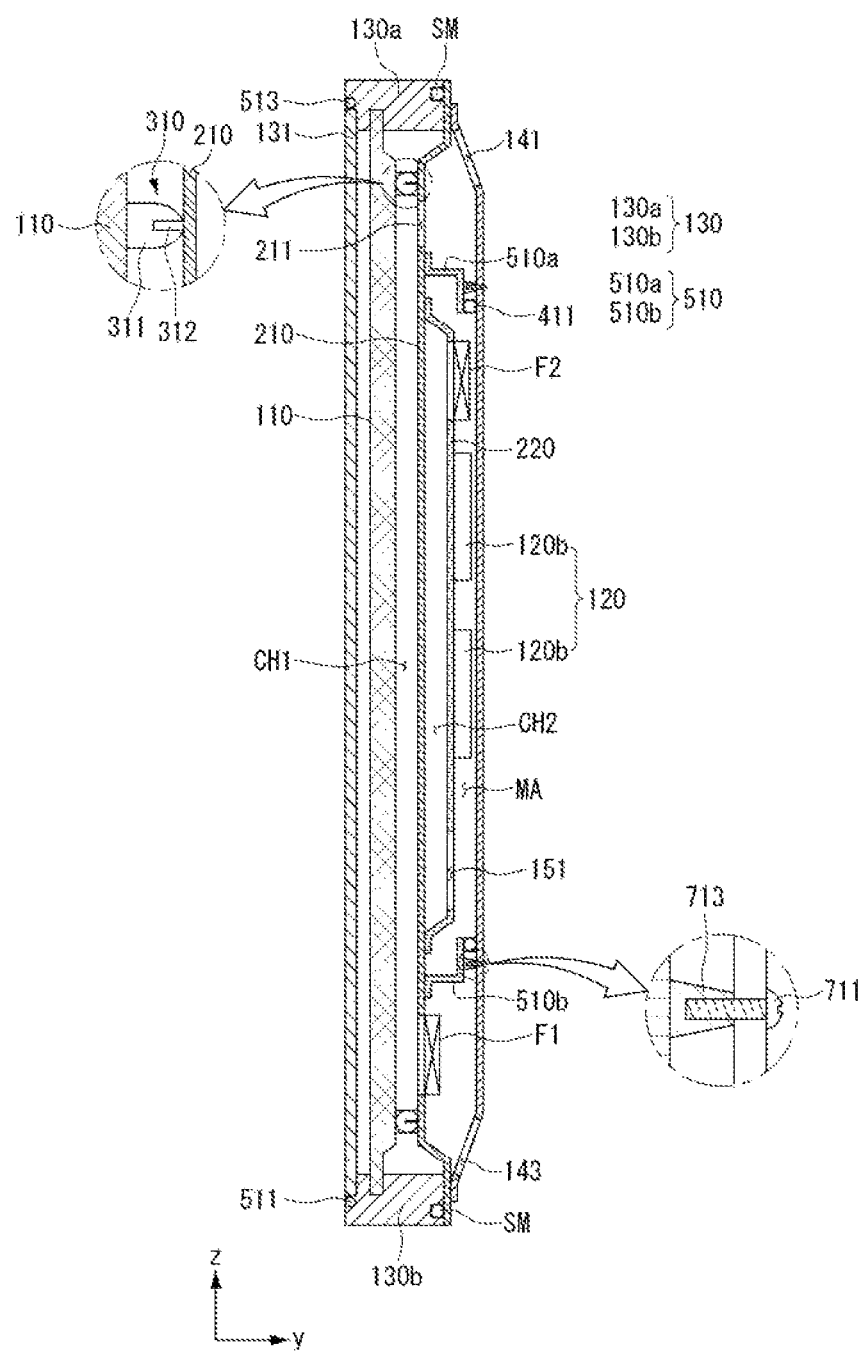
FIG. 2 is a cross-sectional view taken along line I-I' of FIG. 1.

FIG. 1 illustrates an overall exterior image of a display apparatus according to an embodiment and FIG. 2 is a cross-sectional view taken along line I-I' of FIG. 1.

Referring to FIGS. 1 and 2, a display apparatus 100 of an example will be described as follows.

Referring to FIGS. 1 and 2, in an example, the display apparatus 100 may include a display module 110, a control unit 120, and a housing 130 in which the display module 110 and the control unit 120 are mounted.

The display module 110 may be provided on a front surface of the display apparatus 100 and the control unit 120 may be stacked and disposed on a rear surface of the display module 110. Here, in respect to the front surface and the rear surface, a side in which an image is displayed in a thickness direction of the display apparatus is referred to as the front surface and the other surface of the front surface is referred to as the rear surface.

The display module 110 may have any scheme of structure. As an example, a display may be implemented as a liquid crystal display (LCD) scheme and implemented as an organic light emitting diode (OLED) scheme or a micro-LED scheme. In the present disclosure, the display will be described by assuming the liquid crystal display scheme. However, the present disclosure may be applied even to other schemes of displays in any degree within a range which is not contradictory.

In the display module 110, a liquid crystal panel, an optical sheet, and a backlight unit positioned on the front surface of the display apparatus 100 may be sequentially stacked and arranged in the thickness direction of the device, and supported by a case. The case protects the display panel and the backlight unit, and secures the rigidity of the display module. Further, the case may serve to receive and dissipate heat generated from a light source and the display panel.

In a preferred embodiment, the front surface of the display module 110, i.e., the display panel may be installed at a predetermined distance from a front substrate 131 installed on the front surface of the housing 130, for example, the rear surface of a glass substrate. Accordingly, a flow path for heat dissipation is formed between the glass substrate 131 and the display module 131 to dissipate heat from the front surface of the device.

The control unit 120 supplies an electric signal required for driving the display module, and the electric signal includes a digital signal and an analog signal. The control unit 120 may be configured in a board form in which circuit elements are mounted on a circuit board, and a driving board may be configured to include a power supply board for power supply, a main board or a T-con board for supplying a digital signal for driving each pixel of the display panel, etc. Further, the control unit 120 may operate to perform an operation to be described below in order to determine whether the front substrate 131 is damaged, and provide a notification for notifying a manager of whether the front substrate 131 is damaged. Such an operation will be described below in detail.

The housing 130 may form an exterior of the display apparatus 100, and components such as the display module 110 and the control unit 120 may be mounted and supported on the housing 130. The housing 130 is coupled to a back cover 140 to have the display module 110 and the control unit 120 mounted therein. The display apparatus 100 may additionally include a sealing member in order to form a closed space in the device from an external space.

The display module 110 may be fixed to an inner edge portion of the housing 130. The housing 130 may be a mechanism that serves as a cabinet to allow the display module 110 to be fixed to the inside of the housing.

When the front substrate 131 is coupled to the housing 130, a sealing member (not illustrated) may be disposed between the front substrate 131 and the housing so as prevent penetration of dust or moisture. Here, the sealing member may be a gasket made of a rubber material.

Meanwhile, a first heat sink 210 is disposed on a back surface of the display module 110 to face the rear surface of the display module 110. The first heat sink 210 is made of a sheet material and is spaced apart from the rear surface of the display module 110 to be disposed so that a channel is formed in which air flows between the first heat sink 210 and the display module 110. As a result, a first channel CH1 may be formed between the display module 110 and the first heat sink 210, through which the air may flow. In the present disclosure, the channel formed between the display module 110 and the first heat sink 210 is referred to as the first channel.

One end 211 of the first heat sink 210 may be fastened to an upper housing 130a and the other end 211 may be installed in a lower housing 130b. In this case, the sealing member (not illustrated) is disposed between the first heat sink 210 and the housings 130a and 130b to seal the inside of the device.

Meanwhile, a sealing unit 310 for maintaining an interval and partitioning the first channel CH1 may be formed between the first heat sink 210 and the display module 110. The sealing unit 310 may be formed on each of both ends of the display module 110 based on a height direction of the device (as a direction crossing a thickness direction of the device, a z axis). The sealing unit 310 may be configured to include a gasket 311 installed in a form of producing from the rear surface of the display module 110 toward the first heat sink 210 and partitioning the first channel CH1 and an insert 312 installed on the front surface of the first heat sink 210 and inserted and coupled into the first gasket. The insert 312 may be fitted into a groove provided in the first gasket 311.

A second heat sink 20 fixed onto the rear surface of the first heat sink 210 while maintaining a predetermined interval from the first heat sink 210 may be installed on the rear surface of the first heat sink 210. As a result, the channel may be formed between the first heat sink 210 and the second heat sink 220, through which the air may pass. In the present disclosure, the channel formed between the first heat sink 210 and the second heat sink 220 is referred to as a second channel CH2.

The control unit 120 implemented in the board form is disposed on the rear surface of the second heat sink 220. The control unit 120 may include a first driving board 120a and a second driving board 120b which are functionally and physically separated. In an example, the first driving board 120a may be the power supply board and the second driving board 120b may be the main board or the T-con board.

The back cover 140 is coupled to the housing on the rear surface of the device. A bracket 510 partitioning a mounting area MA sealed around the driving board 120 may be further formed between the back cover 140 and the first heat sink 210.

The bracket 510 is positioned outside the second heat sink 220 in the height direction of the device. The bracket 510 includes a first bracket 510a disposed above the driving board 120 and a second bracket 510b disposed below the driving board 120 in the height direction. Since the first bracket 510a and the second bracket 510b are disposed to surround the driving board 120 as described above, the driving board 120 may be disposed in the sealed mounting area MA. When the driving board 120 is disposed in the sealed area, a device failure may be prevented by preventing the driving board from being exposed to dust or moisture.

A second gasket 411 is further disposed between the bracket 510 and the back cover 140 to seal the mounting area MA.

Meanwhile, when the back cover 140 is coupled onto the rear surface of the device, the back cover 140 may be bolt-fastened to the rear surface of the device so as to apply pressure to the second gasket along the periphery of the second gasket 411. For bolt fastening, the bracket 510 is configured to include a boss 713 and a bolt or a screw 711 is bolt-fastened to the boss to seal the mounting area.

As a result, the mounting area MA in which the driving board 120 is disposed may be more airtightly sealed.

Each structure is configured to include a fan and a hole so that the air may flow along the flow path in each of the first channel and the second channel. In the following description, a flow of the air through the first channel is referred to as a first flow path and the flow of the air through the second channel is referred to as a second flow path.

The first flow path may be formed to include a first fan F1 supplying the air to the first channel CH1 on one end of a front end or a rear end of the first heat sink 210 in the height direction and a first hole 141 discharging heat-exchanged air from the first channel CH1 on the other end.

The back cover 140 may be configured to include a second hole 143 formed to correspond to a part where the first fan F1 is installed and supplying the air to the first channel CH1 and a third hole 141 discharging the heat-exchanged air output from the first channel CH1 to the outside of the device.

In an example, the second hole 143 may be installed on a lower end of the back cover 140 in the height direction of the device and the third hole 141 may be installed on an upper end of the back cover 140. There is no particular limit in shape of the hole. The hole may have various shapes within a range that does not interfere with the flow of the air forming the flow path.

Assuming that the lower end is a bottom on which the device is installed, cold air is introduced through the second hole 143 and air heated by heat exchange in the first channel hole CH1 is discharged to the top of the device through the third hole 141. When the air is heated, the air moves upward, and as a result, it is advantageous in that the air is circulated when the first hole 143 is disposed on the bottom.

The first fan F1 is installed in the first heat sink 210 as a location facing the second hole 143. That is, the first fan F1 is installed on the lower end of the heat sink 210.

In addition, a first hole 211 may be installed on a rear end of the first heat sink 210 and may be installed at a location corresponding to the third hole 143 provided in the back cover 140.

As a result, when the first fan F1 operates in a direction toward the first channel CH1, the air is introduced into the device and supplied to the first channel CH1 through the second hole 143 of the back cover 140. Thereafter, the air heat-exchanged in the first channel CH1 may be discharged to the outside of the device through the first hole 211 and the third hole 141 of the back cover 140.

The second flow path as a flow of air circulated in the second channel CH2 and the closed mounting area MA may be formed to include a second fan F2 formed at any one of the upper end or the lower end of the second heat sink 220 in the height direction of the device, and a fourth hole 151 formed at the other end and circulating the air heat-exchanged in the second channel CH2. In the drawing, the second fan F2 is illustrated as being formed on the upper end of the second heat sink 220.

The second fan F2 may force the air to flow to the second channel CH2, and the air which flows along the second channel CH2 is circulated to the mounting area MA through the fourth hole 151 to form the second flow path.

Meanwhile, the configuration of the housing described above is described as an example, and housings having various structures and shapes may be used for accommodating the display module.

Meanwhile, in an embodiment of the present disclosure, the display apparatus may be configured to include a sensor for detecting damage to the front substrate 131. In a preferred example, the sensor may be configured to include a transmitter 511 that emits light having a specific wavelength and a receiver 513 receiving the light emitted from the transmitter 511.

In an example, the transmitter 511 may be disposed on a lateral surface of the front substrate 131 and the receiver 513 may be disposed on the other lateral surface of the front substrate 131 to face the transmitter 511 with the front substrate 131 interposed between the receiver 513 and the transmitter 511. Here, based on FIG. 2, the transmitter 511 and the receiver 513 may be disposed based on a y-axis direction of the FIG. 2, and the y-axis direction may be the height direction of the device, but the y axis need not particularly be the height direction, but is preferably a direction following a plane of the front substrate 131.

Figure 3:
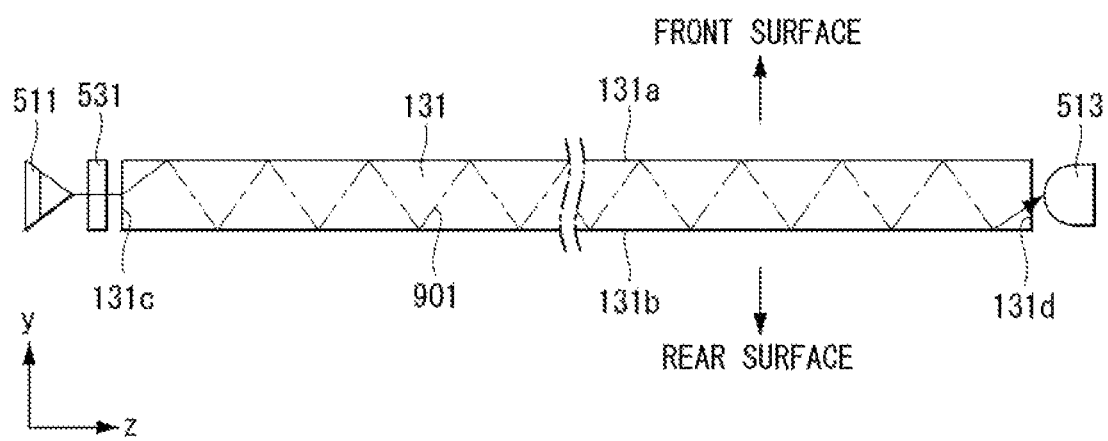
FIGS. 3 to 6 schematically illustrate an arrangement relationship of a front substrate, a transmitter, and a receiver.
Figure 4:
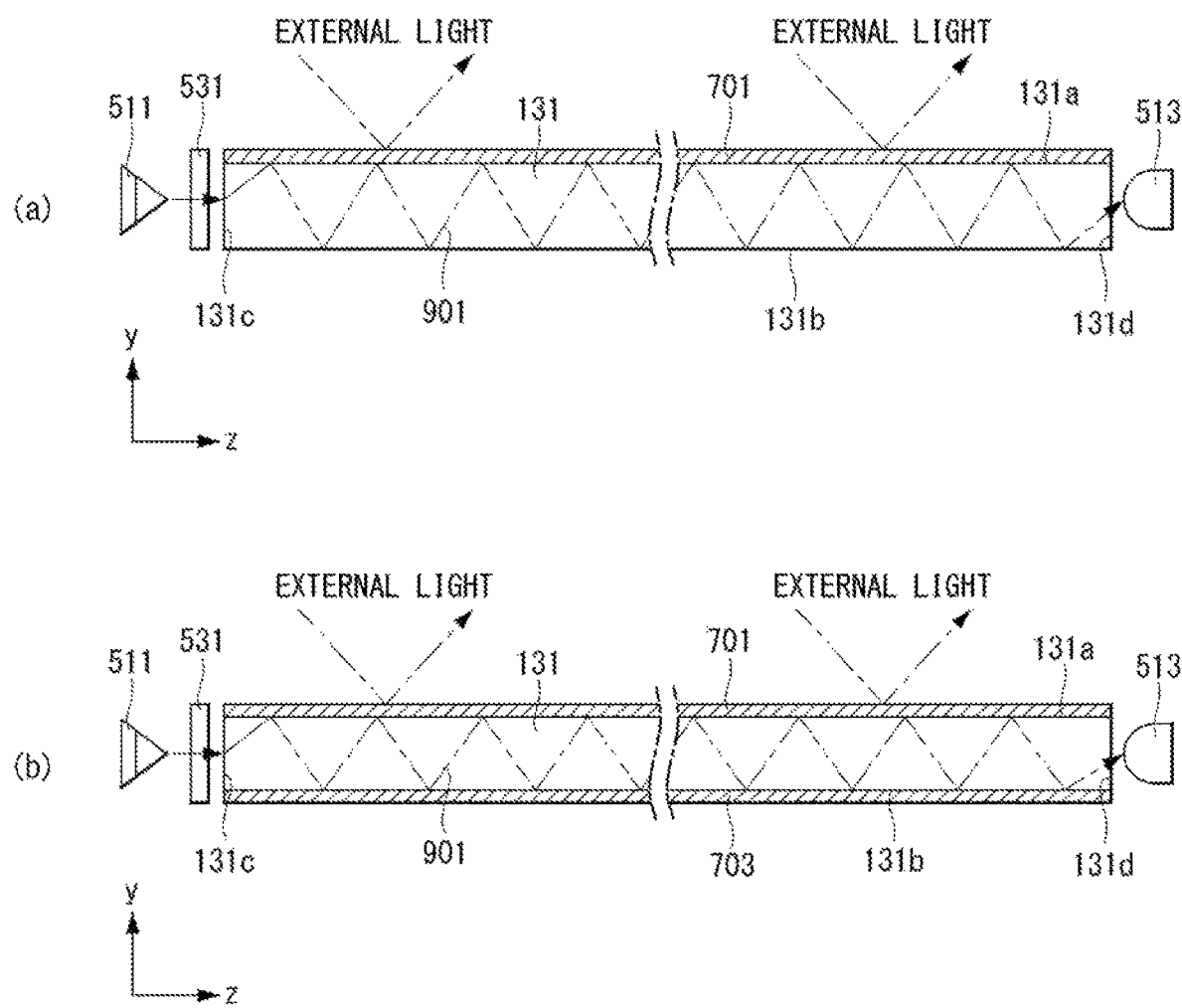
Figure 5:
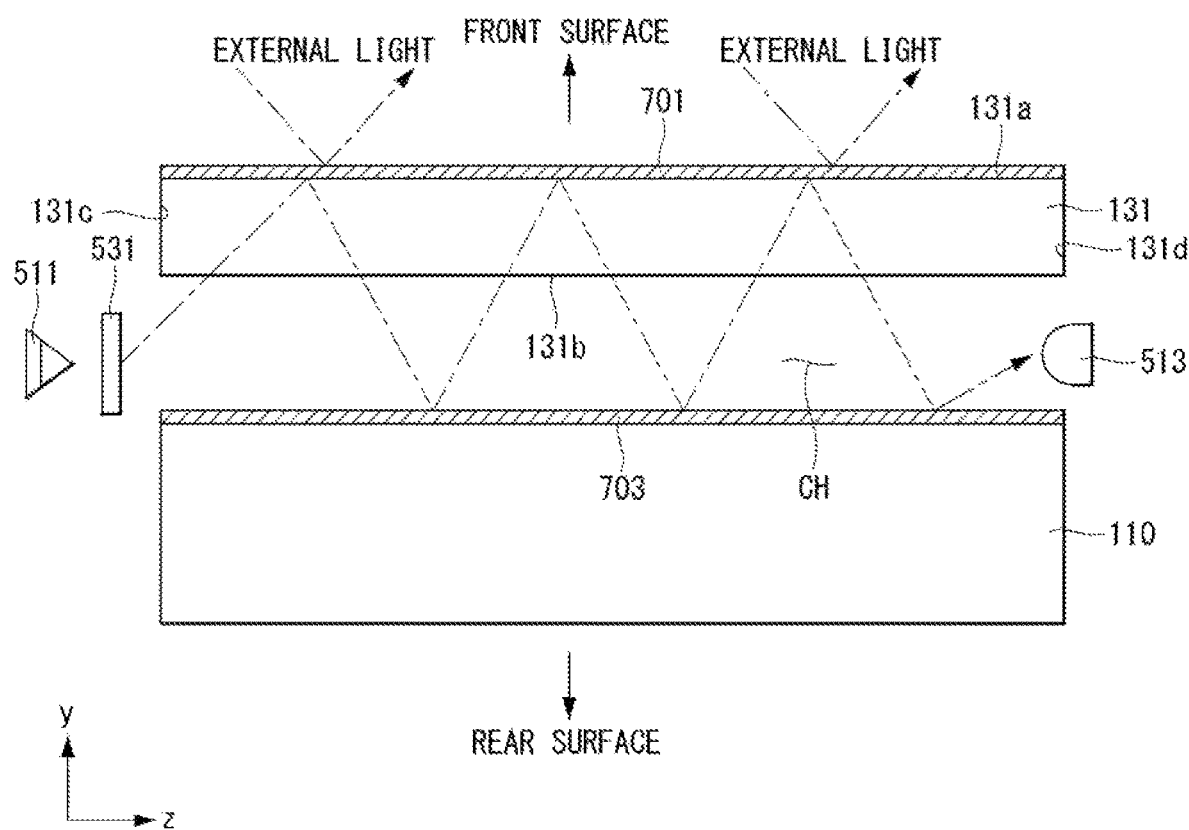

FIGS. 3 to 5 schematically illustrate an arrangement relationship of a front substrate 131, a transmitter 131, and a receiver 513.

Referring to the drawings, in an example, the front substrate 131 as the glass substrate has a rectangular cross-sectional shape which elongates in a z-axis direction. As a result, the front substrate 131 may include a front surface 131a and a rear surface 131b, and two lateral surfaces 131c and 131d. Here, the front surface refers to a direction in which the image is displayed in the display apparatus 100 and the rear surface refers to a direction facing the front surface. The lateral surface may include a first lateral surface 131c on the left and a second lateral surface 131d on the right. As a result, an interval between the front surface 131a and the rear surface 131b may be the thickness of the front substrate 131.

In an example, the transmitter 151 may be arranged adjacent to the first lateral surface 131c of the front substrate 131 and the receiver 513 may be positioned adjacent to the second lateral surface 131d.

As a result, the transmitter 151 may be disposed to face the receiver 513 with the front substrate 131 interposed therebetween. Therefore, light 901 emitted from the transmitter 151 may be incident on the front substrate 131 through the first lateral surface 131c of the front substrate 131, may travel in the front substrate 131 in the z-axis direction (referred to as a first direction as a direction following the surface of the substrate) of the drawing, and may be emitted from the second lateral surface 131d and received by the receiver 513.

In this case, by adjusting an angle of the light 901 incident in the front substrate 131, the light incident in the front substrate 131 satisfies a total reflection condition to be totally reflected inward on each of the front surface 131a and the rear surface 131b and travel inside the front substrate 131.

Meanwhile, in an example, a polarization filter 531 may be further disposed between the transmitter 511 and the first lateral surface 131c of the front substrate 131. The polarization filter 531 passes only a polarization component in any one direction and absorbs or reflects the other component in the incoming light.

As the polarization filter 531 is disposed between the transmitter 511 and the front substrate 131, only a longitudinal wave which is a polarization component which vibrates in a vertical direction, i.e., the thickness direction (based on the y axis in the drawing), of the front substrate 131 in the light incident toward the front substrate 131 from the transmitter 511 may be incident in the front substrate 131. Therefore, as the longitudinal wave is incident in the front substrate 131, reflection may easily occur on each of the front surface 131a and the rear surface 131b of the front substrate 131, and, as a result, the longitudinal wave may travel while reducing loss of the light in the z-axis direction of the drawing. Further, since only the longitudinal wave exists and a transverse wave does not exist in the light traveling in the front substrate 131, a reception rate may be increased by preventing interference from light emitted from a plurality of transmitters.

FIG. 4 is a diagram for describing an example in which a reflective film is further disposed on at least one of the front surface 131a and the rear surface 131b of the front substrate 131.

FIG. 4(A) illustrates an example in which the front substrate 131 is configured to include a first reflective film 701 attached to the front surface 131a, and FIG. 4(B) illustrates an example in which the front substrate 131 is configured to include a second reflective film 703 attached even to the rear surface 131b.

The reflective films 701 and 703 may be attached to the front substrate 131 through a transparent adhesive, and fixed to the front surface 131a of the front substrate 131 by thermal compression through a laminating process, etc.

The reflective films 701 and 703 may be configured to selectively reflect only light in the same wavelength band as the light generated by the transmitter 511 or may reflect light in a specific band, which includes the light in the same wavelength band as the light generated by the transmitter 511. In an example, the transmitter 501 may irradiate infrared rays (IR).

In this case, when wavelength bands of the infrared rays are in the range of 780 to 1000 nm, the reflective films 701 and 703 may be configured to reflect light in the same wavelength band or reflect light having a larger bandwidth than 780 to 1000 nm.

When the configuration illustrated in FIG. 4(A) is provided, it is possible to prevent a signal from being distorted due to external light.

As described above, the present disclosure of an example is configured in such a manner that the light emitted from the transmitter 511 travels inside the transparent substrate 131 and is received by the receiver 513, and whether the transparent substrate 131 is damaged is determined by using the strength of the received signal. However, when natural light or light generated by lighting is introduced into the device from the outside, the light passes through the front substrate 131 and is mixed with the light emitted from the transmitter 511 to distort the signal.

However, when the transparent substrate 131 includes the first reflective film 701, the first reflective film 701 is attached to the front surface 131 of the transparent substrate 131, and as a result, at least the same light as the light traveling in the transparent substrate 131 in the light incident inside from the outside may not be incident in the transparent substrate 131 but may be reflected from the front surface to the outside. Therefore, whether the front substrate 131 is damaged may be more accurately known by increasing the reception rate of the receiver 513.

According to FIG. 4(B), the front substrate 131 is configured to include a first reflective film 701 attached to the front surface 131a and a second reflective film 703 attached even to the rear surface 131b. Therefore, as described above, the interference by the light incident from the outside may be prevented. Further, additionally, the light traveling inside the front substrate 131 may be propagated while being trapped therein by the first reflective film 701 and the second reflective film 703. That is, the light travels to the receiver 513 while being reflected internally while colliding with the front surface 131a and the rear surface 131b of the front substrate 131. In this case, when some light does not satisfy the total reflection condition on an interface (front surface or rear surface), some light may be lost outside the front substrate 131.

However, according to the configuration illustrated in FIG. 4(B), the light on the interface may not be emitted to the outside of the reflection substrate 131 by the first or second reflective film 701 or 703, but may be reflected internally, thereby preventing the loss of the light.

FIG. 5 is a diagram illustrating an example in which the second reflective film 703 is attached to the front surface of the display module 110.

In this example, the front substrate 131 is disposed so that a channel ch through which the air is circulated is formed to be spaced apart from the display module 110 by a predetermined distance. While cold air moves to the channel between the front substrate 131 and the display module 110, heat is dissipated from the display module 110.

In this example, the transmitter 511 and the receiver 513 may be disposed to face the first lateral surface 131c and the second lateral surface 131d of the front substrate 131, respectively, or positioned to face each other with the channel ch interposed between therebetween as illustrated in FIG. 5.

According to such a configuration, the light emitted from the transmitter 511 may travel toward the receiver 513 while being held between the first reflective film 701 attached to the front surface of the front substrate 131 and the second reflective film 703 attached to the front surface of the display module 110, and the light may be reflected toward the rear surface with the rear surface 131b of the front substrate 131 or the first reflective film 701 as the interface and travel toward the receiver 513 while being reflected toward the front surface from the second reflective film 703.

However, according to such a configuration, the light is propagated toward the receiver with the channel ch as well as the front substrate 131 as a medium. Therefore, since the light should pass through two types of media with different properties, there is a concern that the light will be lost.

When such a point is considered, the display module 110 may be in direct close contact with the front substrate 131 so as to prevent the channel from being formed between the front substrate 131 and the display module 110.

Figure 6:
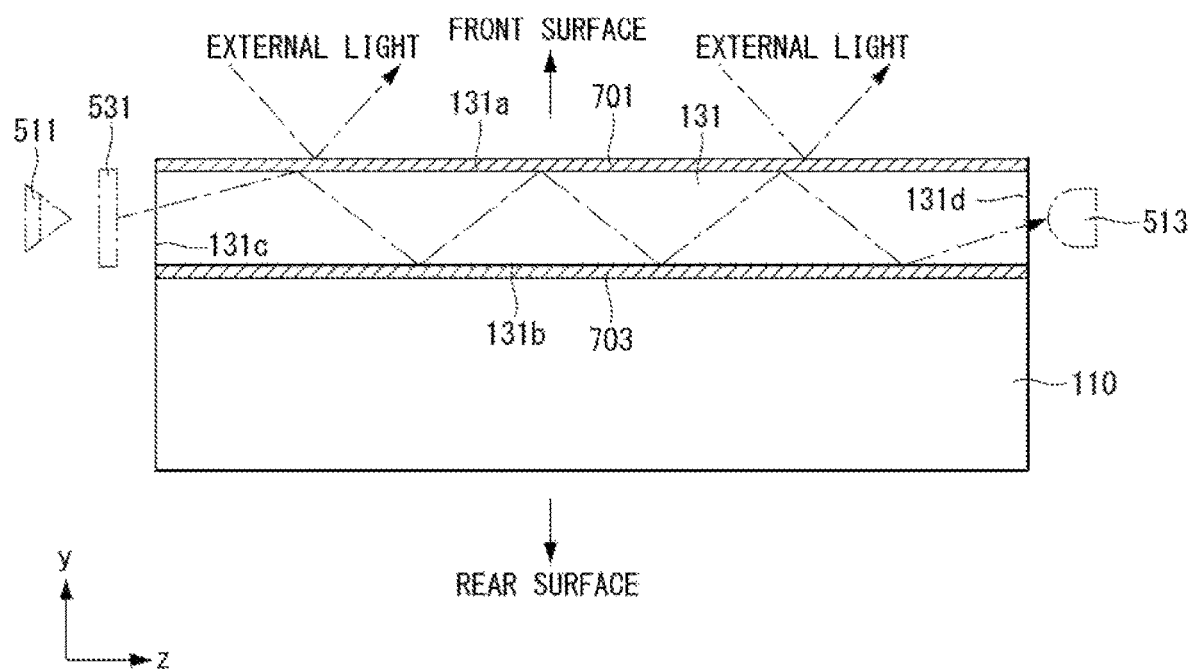

Such an example is illustrated in FIG. 6.

The front surface of the display module 110, i.e., the display panel, may be bonded to the rear surface 131b of the front substrate 131. Various known methods may be used for bonding the display module 110 and the front substrate. As an example, the transparent adhesive may be preferably used, but the present disclosure is not limited thereto. In an example, the display module 110 is bonded to the glass substrate to reduce the thickness of the device.

The transmitter 511 may be positioned to face the first lateral surface 131c of the front substrate 131 and the receiver 513 may be disposed to face the second lateral surface 131d.

According to such a configuration, since the light travels while being held on the front substrate 131, whether the front substrate 131 is damaged may be more accurately known by increasing the reception rate.

Figure 7:
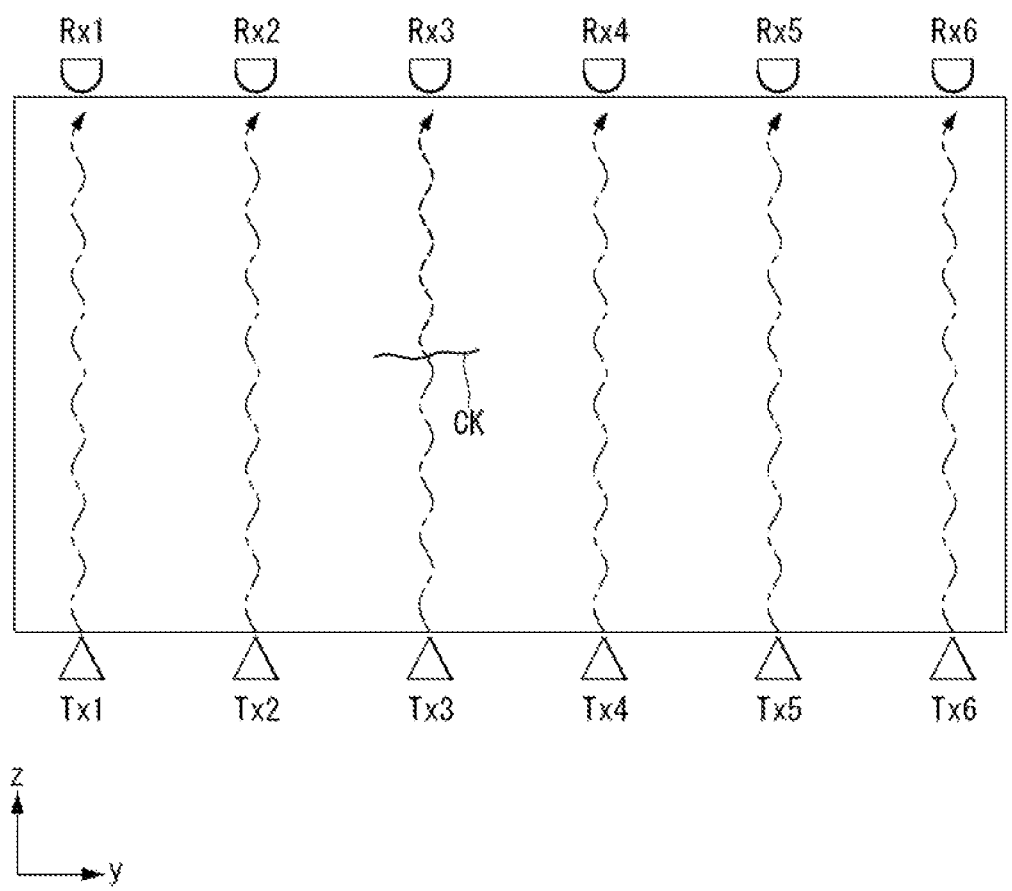
FIGS. 7 to 10 are diagrams for describing arrangement and driving of the transmitter.
Figure 8:
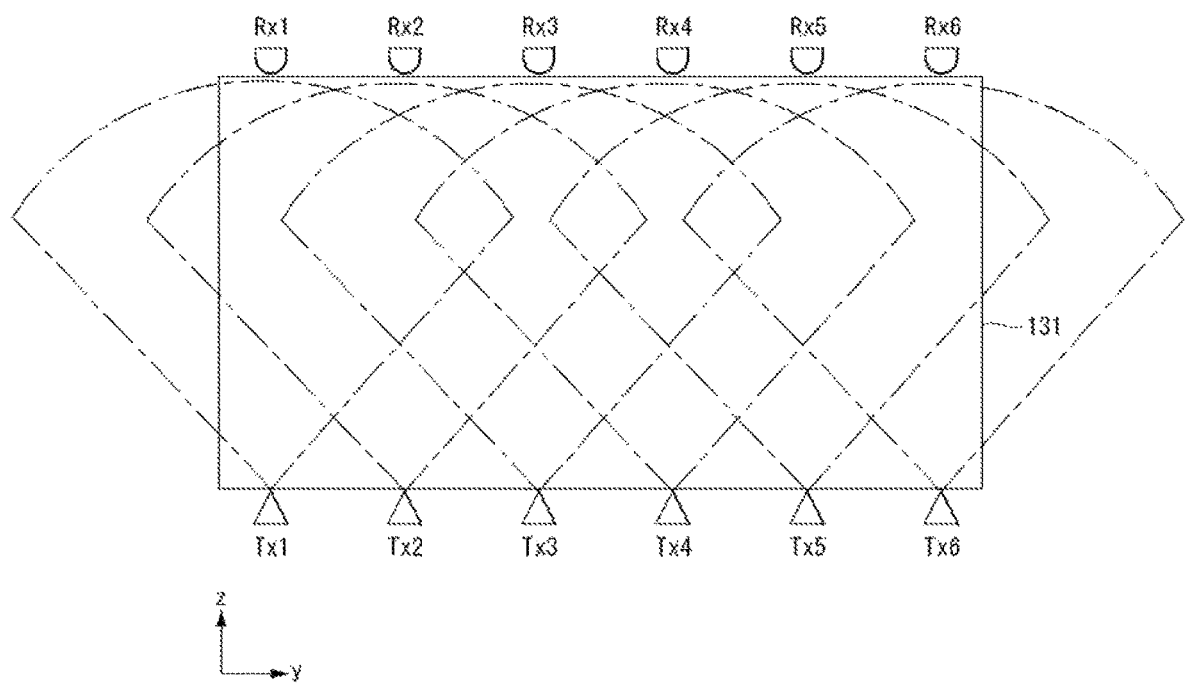
Figures 9, 10:
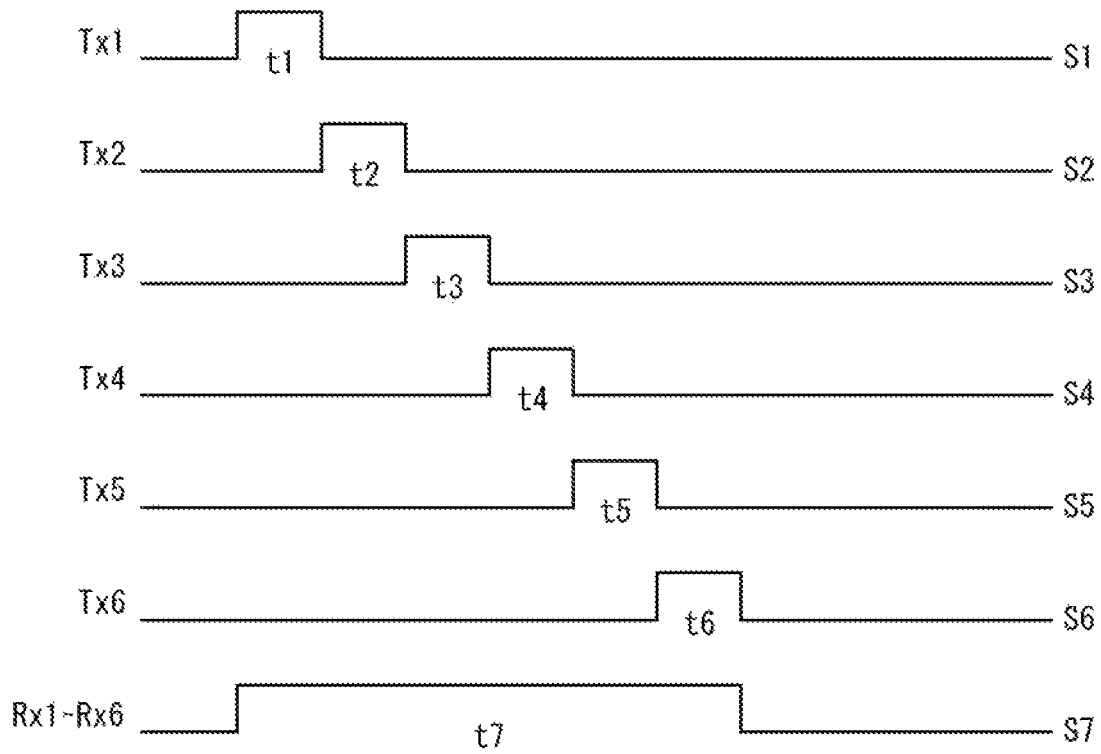

FIGS. 7 to 9 are diagrams for describing arrangement and driving of the transmitter.

Referring to FIGS. 7 to 9, a plurality of transmitters Tx1 to Tx6 may be arranged in the y-axis direction in FIGS. 7 to 9. In an example, the transmitter may be a light emitting diode that emits light having a specific wavelength. As illustrated in FIG. 8, the light emitting diode emits light so as to have a directivity angle in a predetermined range. Here, the directivity angle refers to an angle at which the light is emitted.

The transmitters Tx1 to Tx6 are preferably arranged so that the light emitted by the plurality of transmitters covers the entirety of the front substrate 131 by considering the directivity angle and more preferably arranged so that the light covers at least 90% or more of the surface of the front substrate 131.

The plurality of transmitters Tx1 to Tx6 are arranged so as to be spaced apart from adjacent transmitters by a predetermined distance and a plurality of receivers Rx1 to Rx6 are also arranged at opposite sides to face the plurality of transmitters Tx1 to Tx6, respectively.

As illustrated in FIG. 9, the plurality of transmitters Tx1 to Tx6 may be driven so as to sequentially flicker.

FIG. 9 is a timing diagram for sequentially making the plurality of transmitters Tx1 to Tx6 flicker.

According to the timing diagram, first to sixth transmitters Tx1 to Tx6 sequentially operate for the first time t1 to the sixth time t6.

A first signal S1 makes the first transmitter Tx1 flicker for the first time t1, a second signal S2 makes the second transmitter Tx2 flicker for the second time t2, a third signal S3 makes the third transmitter Tx3 flicker for the third time t3, a fourth signal S4 makes the fourth transmitter Tx4 flicker for the fourth time t4, a fifth signal S5 makes the fifth transmitter Tx5 flicker for the fifth time t5, and a sixth signal S6 makes the sixth transmitter Tx6 flicker for the sixth time t6.

Contrary to this, all of the plurality of receivers Rx1 to Rx6 may operate to be turned on for the seventh time t7 according to a seventh signal S7 to receive the light. Since the seventh time is a time acquired by summing up the first time to the sixth time, the plurality of receivers Rx1 to Rx6 consequently operate to receive accumulated signals (light) by maintaining a turn-on state while being sequentially turned on/off.

Meanwhile, FIG. 10 is a table illustrating accumulated strengths of light which the plurality of receivers Rx1 to Rx6 receive by maintaining the turn-on state for the seventh time.

As illustrated in FIG. 10, in an example, the plurality of receivers Rx1 to Rx6 installed to face the plurality of transmitters Tx1 to Tx6, respectively, receive the light and record the received light as data. When there is a damaged portion (CK in FIG. 8) at a specific location of the front substrate 131, a signal of a specific transmitter will deviate from a normal range. As an example, in FIG. 10, it is illustrated that the damaged portion CK, for example, a crack occurs at a location corresponding to the third receiver Rx3 in the z-axis direction in FIG. 10.

The third receiver Rx3 receives a normal signal within an error range until the front substrate 131 is damaged, but receives an abnormal signal after the damage occurs. Here, the abnormal signal refers to a signal which rapidly fluctuates to a threshold value or more as compared with a reference signal before the front substrate 131 is damaged.

The reference signal may also be a signal acquired by correcting signals accumulated for a predetermined time. For example, a default value of each receiver may be modified based on a signal received for a predetermined time and the modified default value may be used as the reference signal.

Figure 11:
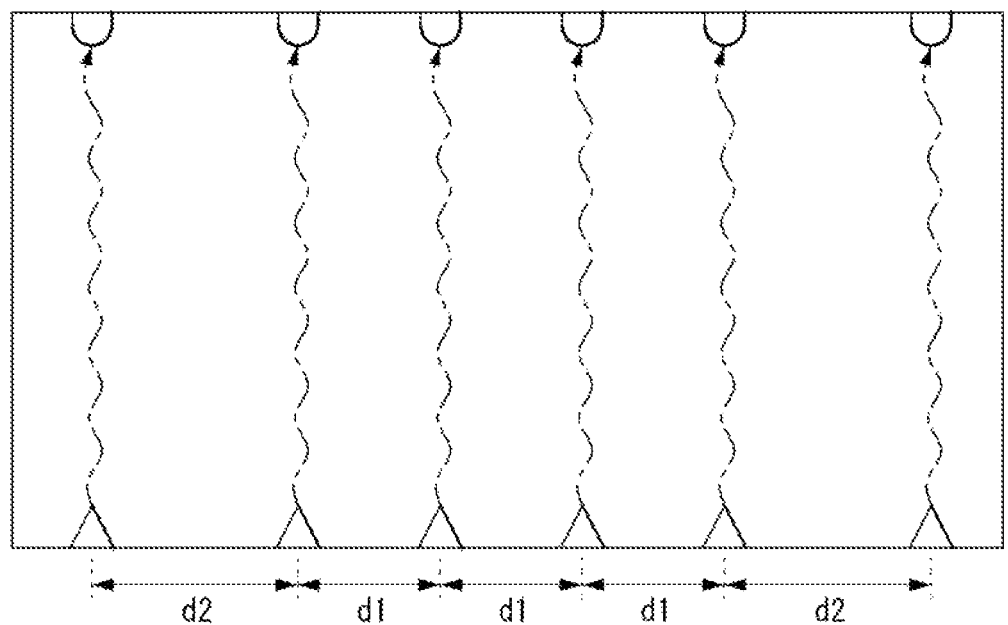
FIG. 11 is a diagram of an example in which an arrangement interval of neighboring transmitters is different.

In FIG. 11, an example will be described in which the plurality of transmitters are disposed to include a first group in which adjacent first and second transmitters are disposed at a first interval and a second group in which the adjacent first and second transmitters are disposed at a second interval different from the first interval.

Referring to FIG. 11, the first transmitter Tx1 and the second transmitter Tx2, and the fifth transmitter Tx5 and the sixth transmitter Tx6 are disposed spaced apart from transmitters adjacent thereto by a second distance d2, and the second and third transmitters Tx2 and Tx3, the third and fourth transmitters Tx3 and Tx4, and the fourth and fifth transmitters Tx4 and Tx5 may be disposed spaced apart from transmitters adjacent thereto, respectively by a first distance d1. Here, the first distance d1 may be smaller than the second distance d2. According to the arrangement, since transmitters are arranged more densely in a middle portion of the front substrate 131 than in an outer portion, whether the middle portion is damaged may be determined more accurately than the outer portion.

Figure 12:
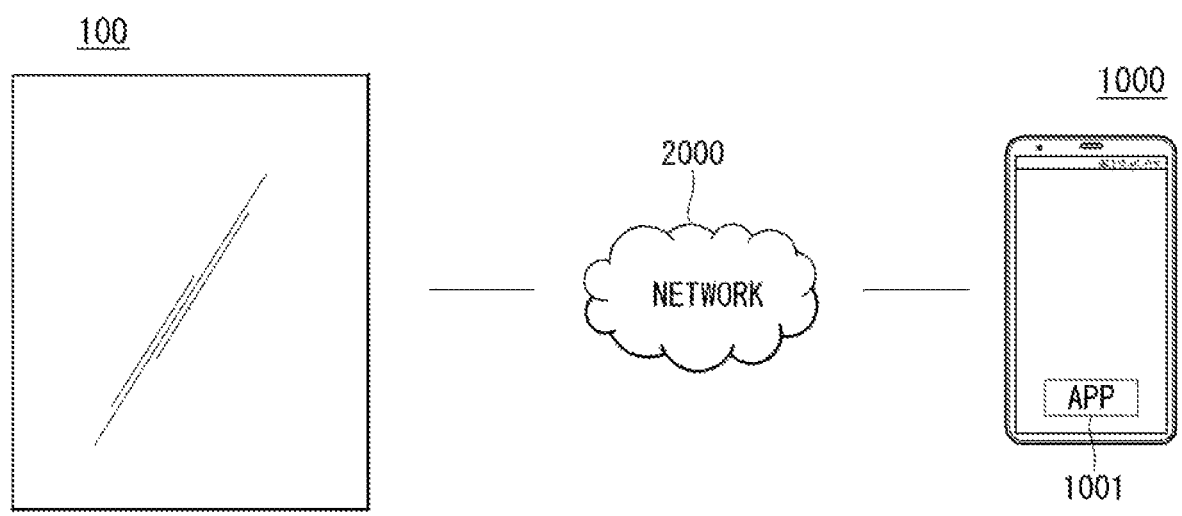
FIG. 12 is a diagram illustrating a communication environment configured to notify, when a display apparatus is damaged, a manager of the damage of the display apparatus.

FIG. 12 is a diagram illustrating a communication environment configured to notify, when a display apparatus is damaged, the damage of the display apparatus is to a manager.

Referring to FIG. 12, the display apparatus 100 having the aforementioned configuration and a communication terminal 1000 of the manager may be connected to each other through a network 2000. Here, the communication terminal 1000 may be a cellular phone used by the manager, but is not particularly limited thereto and may include various means which may communicate with the display apparatus 100, for example, a notebook computer, a desktop PC, a pad, etc.

The communication terminal 1000 may be configured to include a management app 1001. The management app 1001 provides a means installed in the communication terminal 1000 of the manager and managing the display apparatus 100. As an example, the management app 1001 may allow the manager to view or edit a recorded image by accessing a storage space provided in the display apparatus 100 or control the operation of the display apparatus. Further, when the display apparatus 100 is damaged, the management app 1001 displays a push message to notify the manager of the damage.

The display apparatus according to an embodiment of the present disclosure may be configured to periodically/aperiodically store a front image of the device, and notify, when an event occurs, the manager of the occurrence of the event.

Figure 13:
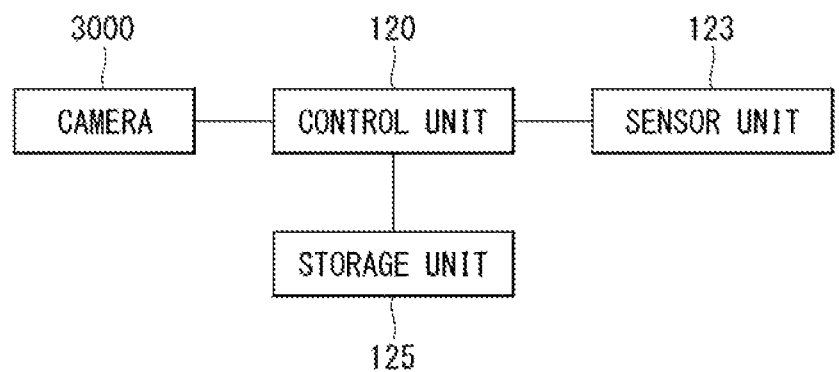
FIG. 13 is a diagram illustrating a functional block of a display apparatus.

To this end, the display apparatus is configured to include a functional block illustrated in FIG. 13.

The display apparatus 100 may be configured to further include a notification providing unit 121, a sensor unit 123, and a camera 3000 in addition to the aforementioned control unit 120.

When the event occurs according to the operation of the sensor unit 123, the notification providing unit 121 may provide a notification for the occurrence of the event to the manager through the network. As an example, the notification may be provided in the form of the push message. The sensor unit 123 may be configured to include a plurality of sensors sensing whether the event occurs in the device, such as an impact sensor, a proximity sensor, a motion sensor, etc. The camera 3000 is installed outside the device to photograph a front image of the device. A photographed image may be stored in the storage unit 125.

Meanwhile, the control unit 120 photographs the exterior of the device, and stores the image in the storage unit or provides the notification to the manager according to the event by controlling each unit.

Figure 14:
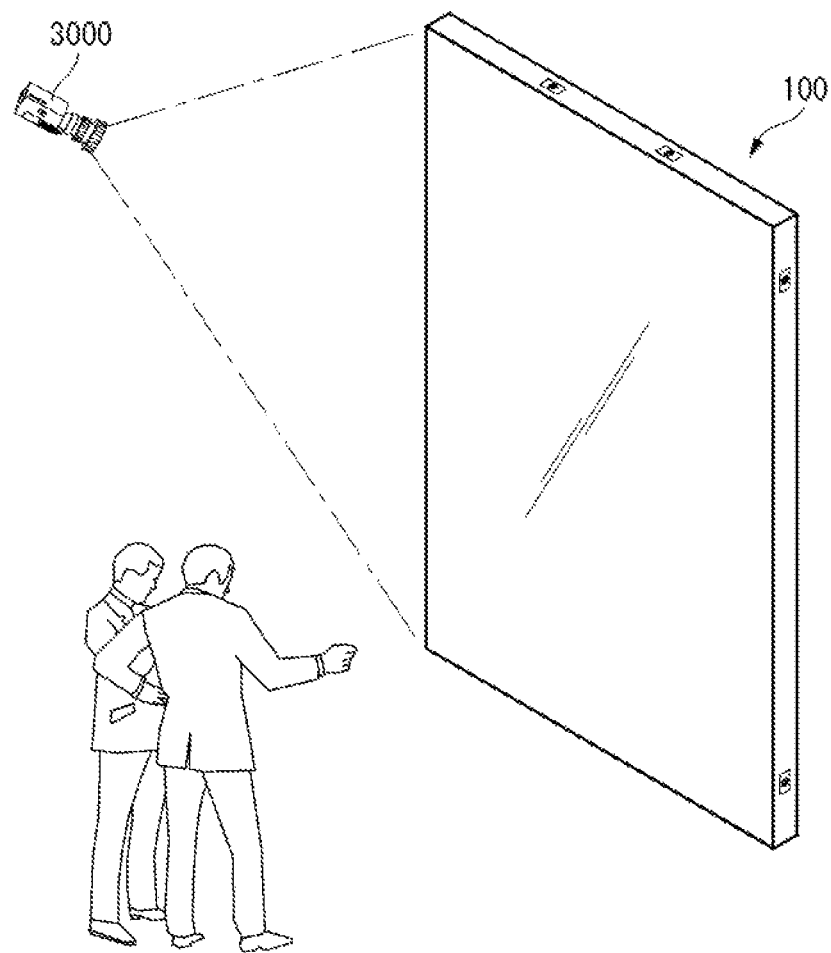
FIG. 14 is a diagram illustrating an installation environment of a display apparatus.

As illustrated in FIG. 14, the display apparatus 100 may be installed outdoors, etc., and the camera 3000 may be installed apart from the device 100 so as to photograph at least the front image of the device.

The camera 3000 photographs the front image of the display apparatus 100 according to the operation control of the control unit 120.

In an example, the control unit 120 may control the camera 3000 to photograph the front image of the display apparatus 100 periodically regardless of the event. As an example, the control unit 120 may obtain an image in units of 10 minutes, and store the obtained image in the storage unit 125 by controlling the operation of the camera 3000 periodically, for example, every 10 minutes regardless of the operation of the device. Here, the image may be a photo considering the storage space of the storage unit 125, but is not limited thereto and may be the photo or a video considering the storage space of the storage unit 125.

The storage unit 125 may keep the stored image in an allocated area, and when the storage space is insufficient by considering the storage space, the storage unit 125 may first delete an old image and record a newly obtained image in the storage space.

Figure 15:
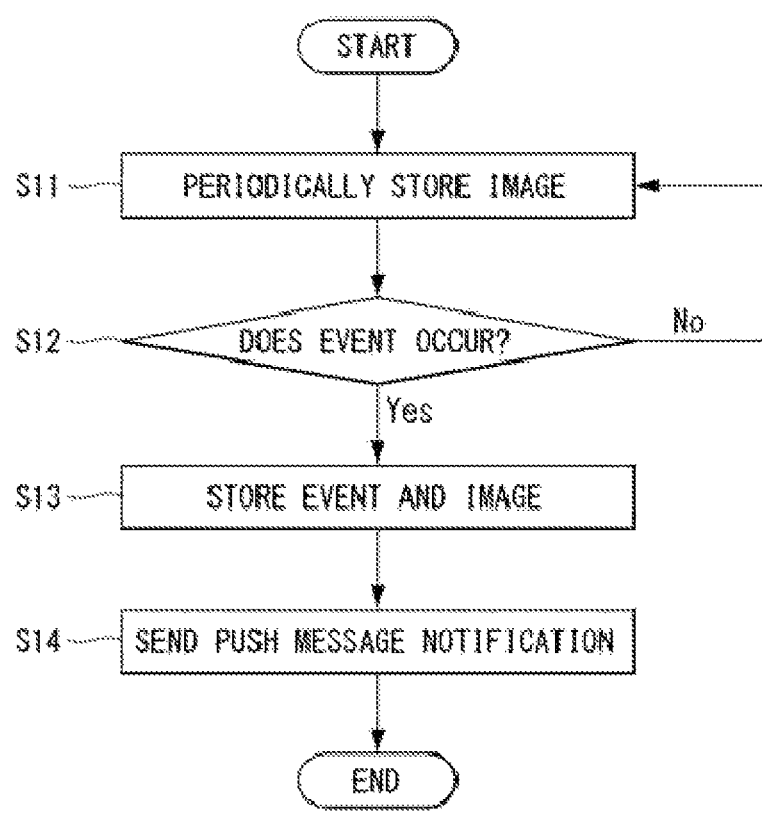
FIG. 15 is a diagram for describing a process of photographing and storing an image according to a case where an event is to occur.

FIG. 15 is a diagram for describing a process of obtaining and storing an image according to a case where an event is to occur.

Referring to FIG. 15, the control unit 120 periodically photographs the image so that the exterior of the device, in particular, the front image 131, is viewed, and stores the obtained image in the storage unit 125 by controlling the operation of the camera 3000 in a first step S11.

In a second step S12, the control unit 120 determines whether an event occurs based on a signal input from the sensor unit. Here, the event may be an access of an object, impact sensing, a motion of the device, etc. For example, the proximity sensor determines an object such as a person, an article, a vehicle, etc., approaches the device, and inputs the result into the control unit 120. When an impact of a threshold value or more on the device is sensed, the impact sensor inputs the fact into the control unit 120. The motion sensor generates a signal whenever the device is turned on and off, and inputs the generated signal into the control unit 120.

When the control unit 120 determines that the event does not occur in the second step S12, the control unit 120 returns to the first step S11 to periodically store the image in the storage unit 125, and when determining that the event occurs, the control unit 120 performs a third step S13.

In the third step S13, the control unit 120 obtains a current image regardless of the image obtained in the first step and stores the obtained image in the storage unit 125 by controlling the operation of the camera 3000, while the control unit 120 also records, in the storage unit 125, a video recorded in a time lapse before and after the event. Here, the video recorded in the time lapse refers to a video stored according to a recording scheme of recording the video according to a time sequence and sequentially deleting a port with no event in the video first recorded according to the time sequence.

In the third step S13, after recording the video in the storage unit, the control unit 120 transmits the push message to the communication terminal of the manager connected through the network to notify the manager of the occurrence of the event.

According to an embodiment of the present disclosure described above, the manager that receives the notification may access the image stored in the storage unit of the device through the network and the control unit 120 may provide the stored image to the communication terminal of the manager according to a request. As a result, since the manager may check whether the device is damaged through the image in real time, the manager may check a state of the device in the remote place to thereby take a follow-up measure.

Effects of the display apparatus according to the present disclosure will be described below.

According to at least one of embodiments of the present disclosure, it is possible to easily determine whether the front substrate constituting the exterior of the display apparatus and a rapid action is enabled in case of damage by easily checking whether the front substrate is damaged even in the remote place.

What is claimed is:

1. A display apparatus comprising:
a display module;
a housing accommodating the display module;
a transparent substrate disposed on a front surface of the display module and installed in the housing;
a transmitter disposed on one end of the transparent substrate and generating light;

a receiver installed on the other end of the transparent substrate to face the transmitter in a first direction, and receiving the light emitted from the transmitter; and a first reflective film attached to a front surface of the transparent substrate, wherein the first reflective film reflects at least light in the same wavelength band as the light.

2. The display apparatus of claim 1, wherein the light emitted from the transmitter passes through the transparent substrate in the first direction and is received by the receiver or passes through between the transparent substrate and the display module and is received by the receiver.

3. The display apparatus of claim 2, further comprising: a second reflective film attached to a rear surface of the transparent substrate, wherein the second reflective film reflects at least the light in the same wavelength band as the light.

4. The display apparatus of claim 2, further comprising: a second reflective film attached to the front surface of the display module, wherein the second reflective film reflects at least the light in the same wavelength band as the light.

5. The display apparatus of claim 1, wherein the transmitter is a light emitting diode having a predetermined directivity angle, and a plurality of transmitters is disposed to cover an entire surface of the transparent substrate, and wherein a plurality of receivers is disposed in the same number as the transmitters so as to face the plurality of transmitters, respectively, with the front substrate interposed therebetween.

6. The display apparatus of claim 5, wherein the plurality of transmitters is disposed to include a first group in which neighboring first and second transmitters are disposed at a first interval and a second group in which the neighboring first and second transmitters are disposed at a second interval different from the first interval.

7. The display apparatus of claim 5, wherein the plurality of transmitters sequentially flickers according to a sequence of time, and the plurality of receivers is turned on at the same time after all of the plurality of transmitters is turned off to receive the signal.

8. The display apparatus of claim 1, further comprising: a polarization filter disposed on the front surface of the transmitter, and selectively transmitting only a component of light which vibrates in a thickness direction of the front substrate.

9. The display apparatus of claim 1, further comprising: a camera for periodically photographing an exterior of the housing; and a storage unit for recording an image photographed by the camera.

10. The display apparatus of claim 9, further comprising: a control unit driving the display module, and determining whether the transparent substrate is damaged based on a signal received from the receiver, wherein the control unit;

determines whether an event occurs based on signals input from sensors, stores a current image in the storage unit by controlling an operation of the camera when the event occurs, and provides a push message to a communication terminal of a manager through a network.

11. The display apparatus of claim 10, wherein the control unit further stores a moving picture photographed in a time lapse in the storage unit when the event occurs.

12. The display apparatus of claim 10, wherein the control unit provides the image recorded in the storage unit to the communication terminal of the manager according to a request.

* * * * *